Sept. 5, 1967 — E. E. REED — 3,339,515
ATMOSPHERIC PRESSURE STORAGE AND TRANSPORTATION OF VOLATILE LIQUIDS
Filed July 6, 1965 — 2 Sheets-Sheet 2

INVENTOR
E. E. REED
BY Young and Quigg
ATTORNEYS

' # United States Patent Office 3,339,515
Patented Sept. 5, 1967

3,339,515
ATMOSPHERIC PRESSURE STORAGE AND TRANSPORTATION OF VOLATILE LIQUIDS
Edwin E. Reed, Bartlesville, Okla., assignor to Phillips Petroleum Company, a corporation of Delaware
Filed July 6, 1965, Ser. No. 469,409
7 Claims. (Cl. 114—74)

This invention relates to the storage of volatile liquids at atmospheric pressure and subatmospheric temperatures. In one aspect this invention relates to a method and means for confining a volatile liquid in a container with a marine vessel for transportation of the liquid at atmospheric pressure and subatmospheric temperature. In another aspect this invention relates to a double-wall container for confining a volatile liquid at atmospheric pressure wherein the two walls of the container constitute a primary and secondary barrier for the confined liquid and wherein the two walls coact as load-bearing walls for the confined liquid. In still another aspect this invention relates to a double-wall tank suitable for carrying a volatile liquid at atmospheric pressure and subatmospheric temperature that can be installed in a marine vessel without substantial modification of the hull structure of the marine vessel.

In the transportation by water of materials such as liquefied petroleum gases, including methane, ethane, propane, butane and mixtures thereof, as well as liquefied ammonia, hydrogen, nitrogen, helium and the like, at substantially atmospheric pressure and subatmospheric temperatures there has existed a need for a container that can be used inside the walls formed by the existing ballast tanks in a marine tanker without requiring modification of those walls and without requiring that those walls be constructed of low temperature-resistant alloys which are quite expensive. In order to receive the approval of classification societies and governmental regulatory agencies, it is usually necessary to provide a secondary barrier for containing the liquid in case of failure of the primary barrier shell. It has been proposed to solve this problem by (1) using an insulating blanket inside the tank, in which case the insulating blanket is the primary barrier and the tank shell is the secondary barrier; (2) using an insulating blanket outside the tank, in which case the insulating blanket is the secondary barrier and the tank shell is the primary barrier; or (3) using an internal and/or external insulating blanket on the primary shell together with an external nonload-bearing wall or shell so as to provide a void space around the tank. Use of an insulating blanket as the primary barrier proved impractical because the contained liquid penetrates the insulation joints, so that a primary barrier actually did not exist. For the same reason it is impractical to use the insulating blanket as the secondary barrier. In either case, failure of the primary barrier permits the contained liquid to penetrate the insulation and contact the carbon steel inner wall of the ballast tanks with resultant cooling, increase in brittleness and possible destruction of those walls and the tanker hull by even a light impact. Use of an internal and/or external insulating blanket on the primary barrier wall together with an external nonload-bearing wall with a void space around the tank is a step in the right direction but is not practical because such practice requires extensive and expensive modification of the tanker interior which renders it unsuitable for other uses.

According to the present invention a double-wall tank is constructed with an internally-braced outer load-bearing wall and an inner load-bearing primary barrier shell secured to the internal bracing of the outer wall so that a unitary tank results that can be placed in the hold of a marine tanker with little or no modification of the tanker hold. The tank is supported on load-bearing insulation blocks on the inner bottom of the tanker and is anchored by the insulating blocks at one point and is free to slide upon the insulating blocks at all other points. Vertical and horizontal movements of the tank are prevented by a series of hold-down blocks around the upper portion of the tank. The blocks are arranged to allow for expansion and contraction of the tank without vertical or horizontal movement of the tank.

It is an object of this invention to provide a self-supporting double-wall tank for storage and transportation of liquefied gases at atmospheric pressure and subatmospheric temperatures and a method for fabricating such tank. It is also an object of this invention to provide a method and means for confining a liquefied gas in a double-wall tank at atmospheric pressure and subatmospheric temperature wherein both walls of the confining vessel cooperate as load-bearing walls. A further object of this invention is to provide a self-supporting double-wall tank for the marine transportation of a liquefied gas at atmospheric pressure and subatmospheric temperature that can be installed in a marine tanker with little or no modification of the tanker hull. Other objects and advantages will be apparent to one skilled in the art upon studying this disclosure, including the detailed description of the invention and the drawing wherein:

Figure 1:
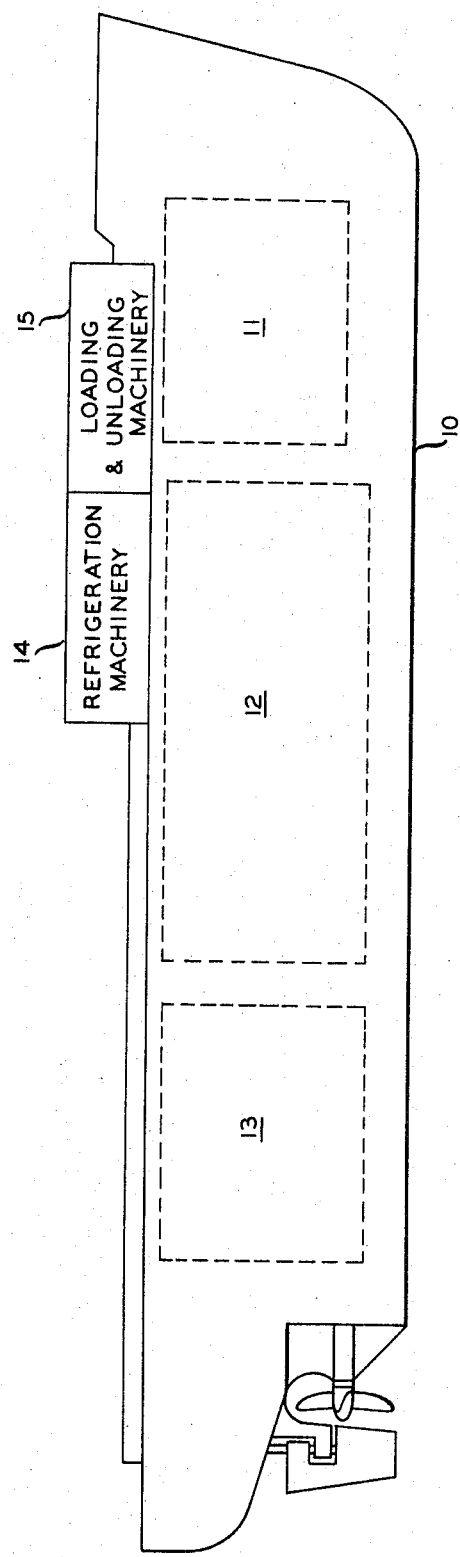
FIGURE 1 is a schematic elevation of a tanker showing the relative positions of the tanks for containing liquefied gases.

Referring now to the drawing, FIGURE 1 shows a tanker 10 containing tanks 11, 12 and 13. Refrigeration machinery 14 and loading and unloading machinery 15 are conventional and will not be described in detail. The tanker 10 comprises a conventional tanker hull with the usual propulsion means and other conventional facilities.

Figure 2:
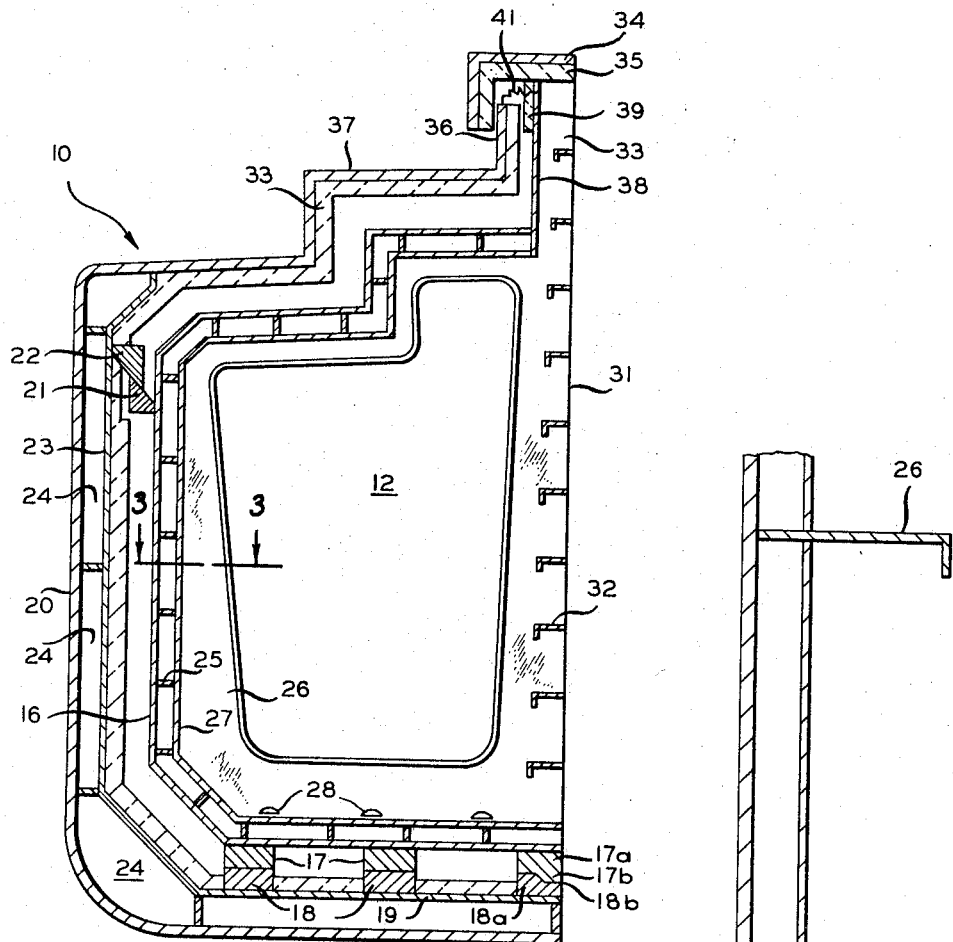
FIGURE 2 is a sectional elevation of one side of a tanker hull with a liquefied gas container positioned therein.

FIGURE 2 shows one half of a tank positioned in the tanker 10, for example tank 12 about midship of the tanker 10. The external shell 16 of the tank 12 has secured to its bottom edge a plurality of spaced blocks 17 of load-bearing insulation such as wood or a resin. One substantially square block or a series of in-line substantially square blocks indicated at 17a has a key element 17b. Blocks, substantially square, of load-bearing insulation 18 are secured to the inner bottom 19 of the vessel 10 with one or a series of inline blocks 18a having in their upper surface a keyway 18b to receive the key 17b. The blocks 17a and 18a anchor the tank 12 along a line parallel with the longitudinal axis of the vessel 10. A similar series of keyed blocks (not shown) anchors the tank 12 along a line transverse to the longitudinal axis of the vessel 10 so that the tank 12 is anchored at a single point along its bottom surface and is free to slide on the blocks 18 in all other directions. A series of blocks 21 is secured to the outer wall 16 of tank 12 along its upper portion. The upper surface of the blocks 21 is sloped upwardly and outwardly along a line that runs through the center of blocks 17a and 18a. A series of matching blocks 22 is secured to the inner wall 23 of the ballast tanks 24 of the tanker 10 and each has its lower surface sloped so as to meet the upper surface of the blocks 21 in sliding contact. The blocks 21 and 22 cooperate to prevent vertical or longitudinal movement of the tank 12 but at the same time allow expansion and contraction of the walls of tank 12 along the matching surfaces of blocks 21 and 22. A plurality of spaced flat stiffening plates 25 is secured to the inner surface of the shell 16 of tank 12 normal to the shell 16 and parallel with the longitudinal axis of the ship 10. A series of stiffening plates 26 is secured to the inner surface of shell 16 normal to the surface of shell 16 and normal to the longitudinal axis of the ship 10.

Figure 3:
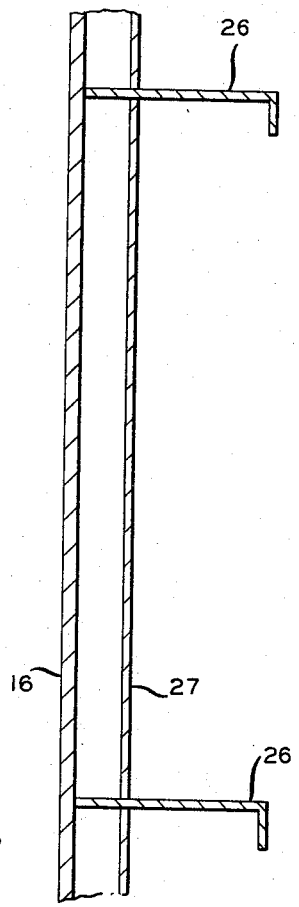
FIGURE 3 is a section along line 3—3 of FIGURE 2.

The stiffening plates 26 extend farther into the tank 12 than do the stiffening plates 25 and are fabricated from plate having the configuration of an (L) or a (T) as shown in FIGURE 3. The inner shell 27 of tank 12 is fitted between stiffening plates 26 in contact with the extended edges of the stiffening plates 25 and is secured in position by welding to the sides of stiffening plates 26 and by plug welding to the edges of the stiffening plates 25. The shell 27 forms the primary barrier for the confined liquid and shell 16 forms the secondary barrier for the confined liquid. The two shells 27 and 16 are formed into a unitary structure by the stiffening plates 25 and 26 and both shells cooperate as load-bearing shells in confining and supporting the liquid in the hold of the ship 10. Weep holes 28 in stiffening plates 26 provide communication between the stiffening plates 26 when the liquid level in the tank falls below the top of the stiffening plate 26 which extends across the bottom of tank 12.

A bulkhead 31 is positioned vertically along the center longitudinal axis of the tank 12 so as to divide the tank 12 into two sections, thereby reducing the free surface of the confined liquid. Longitudinal stiffening plates 32 are secured to the bulkhead 31.

The inner surface of the hold of the ship 10 is covered with a layer of insulation 33 which is preferably polyurethane resin foamed-in-place but can be blocks of foamed urethane resin or other suitable insulation.

The tank 12 terminates at the top in an opening 33 enclosed by a dome member 34 insulated on its inner surface as indicated at 35. The dome 34 is secured by conventional means (not shown) to an upwardly extending projection 36 of the deck structure 37 of the vessel 10. The outer surface of the neck 38 of tank 12 is insulated as indicated at 39 and the neck 38 is sealed to the member 36 by a flexible metal diaphragm 41.

The ballast tanks 24 are contained between the hull 20 of the ship 10 and the ballast tank wall 23.

The cargo tanks will be fabricated from a low temperature-resistant metal, preferably 18–8 type stainless steel. A low temperature-resistant metal is one that retains a substantial amount of its strength at the low temperature experienced in use. Other materials which are suitable for service in a liquefied natural gas (LNG) ship at −250° F. are the so-called "9-nickel" steels and certain aluminum alloys such as aluminum-magnesium alloys. For service in an LNG ship 18–8 type stainless steel is preferred because welding of this metal can be easily accomplished by conventional means with a minimum of welder and procedure qualifications and with no need for stress relieving. The outer shell of the double wall tank structure will be somewhat thicker than the inner wall and usually by a ratio of 3:2. For example, where the outer wall thickness is one inch, the inner wall thickness will be about two-thirds of an inch. The self-supporting, independent cargo tanks will be supported on the inner bottom of the tanker by a series of pedestals or blocks of load-bearing insulation. This insulation can be wood or a resin which is not subject to cold flow such as a phenolic resin and a melamine resin laminated with fibers of glass or asbestos. The blocks of insulation will operate in pairs, one block being secured to the tank and the matching block being secured to the inner bottom of the ship so that the blocks are free to slide against each other to adjust to thermal changes. The tank will be anchored at one point by blocks having matching keys and keyways. The tanks will be secured against vertical or horizontal movement by pairs of insulation blocks secured respectively to the ship inner hull and the outer tank shell at the upper portion of the tanks with the matching faces of the pairs of blocks on a line with the anchor point of the tank so that the tank can adjust to thermal changes and still be secured by the pairs of blocks.

Since the weight of the cargo tanks and their contents is carried on pedestals resting on the false bottom of the ship, complete freedom is provided for the use of whatever insulation material is proved to be the best from the standpoint of heat conductvity, resistance to fire and freedom from mechanical breakdown. The preferred insulation is approximately 12 inches of foamed polyurethane. This insulation can be either foamed in place or built up in blocks depending on the preferred practice in the building yard. The insulation will be held in place by stainless steel studs welded to the ship inner hull surface, with joints sealed by suitable mastic materials in the case of block application. Also, in the case of block application, insulation is applied in at least two layers with stainless steel studs holding the inner insulation layer against the ship inner hull and the outer layer is held in place by stainless steel studs imbedded in the blocks in the inner insulation layer.

Cargo loading and unloading machinery and refrigeration machinery are conventional and need not be described here.

The void space surrounding the cargo tanks, i.e., between the outer tank wall and the insulation, is filled with nitrogen produced on board by a commercial-type nitrogen generator. The nitrogen is dried to prevent condensation on surfaces exposed in the void spaces. The nitrogen in the void spaces is tested continuously or intermittently so as to detect cargo tank leakage if such should occur.

That which is claimed is:

1. The method of fabricating a double-wall cargo tank for confining a volatile liquid at atmospheric pressure in the hull of a ship wherein the inner and outer walls cooperate to form a unitary load-bearing structure and also provide a primary and secondary barrier for the confined liquid, which method comprises attaching a plurality of spaced stiffening plates to the inner surface of a first shell normal to the shell wall and normal to the vertical axis of the shell; attaching a plurality of spaced stiffening plates to the inner surface of said first shell normal to the shell and parallel to the vertical axis of the shell and extending beyond the extended edges of the plates normal to the vertical axis of the shell; fitting a second shell between the plates parallel to the vertical axis of the shell and in contact with the edges of the plates normal to the vertical axis; plug welding the second shell to the edges of the plates normal to the vertical axis; welding the second shell to the sides of the plates parallel to the vertical axis; positioning the double-wall tank on a plurality of load-bearing insulation blocks on the bottom of the ship hull, anchored at one point and free to slide on the blocks at all other points; securing to the exterior of the tank in spaced relationship a plurality of load-bearing insulation blocks each having its upper surface sloped upwardly and outwardly along a line common with the anchored point of the tank; securing to the interior of the ship hull a plurality of load-bearing insulation blocks each having its lower surface sloped and in sliding contact with one of said blocks secured to the exterior of the tank; and applying a layer of insulation between the tank and the ship hull.

2. In the method of fabricating a tank for confining a volatile liquid in a ship hull at atmospheric pressure wherein longitudinal horizontal stiffening plates are attached normal to the inner surface of the tank shell the improvement comprising positioning a second shell within the tank shell; securing the second shell to the stiffening plates; positioning the tank on a plurality of load-bearing insulation blocks on the bottom of the ship hull; anchoring the tank at about its center point on said blocks; and applying a layer of insulation between the tank and the ship hull.

3. The method of claim 2 wherein transverse stiffening plates are attached to the inner surface of the tank shell so as to extend beyond the edges of the longitudinal horizontal stiffening plates, the second shell is secured to the extended edges of the longitudinal horizontal plates, is fitted between the transverse plates; and is secured to the sides of the transverse plates.

4. A vessel for marine transportation and storage of a volatile liquid at atmospheric pressure comprising a ship hull having incorporated therewith means for marine propulsion;
- at least one tank mounted in said ship hull on a plurality of load-bearing insulation blocks, anchored at one point and free to slide on the others to adjust to thermal changes;
- a plurality of load-bearing insulation blocks attached about the external periphery of the tank each having its upper surface slanted upwardly and outwardly from said tank on a line passing through the anchor point of the tank;
- a plurality of load-bearing insulation blocks attached to the inner surface of the ship hull each having its lower surface slanted downwardly and outwardly in sliding contact with a block attached to the tank; and
- a layer of insulation between the tank and the ship hull.

5. A marine vessel according to claim 4 wherein said tank comprises a first low temperature-resistant metal shell;
- a plurality of low temperature-resistant metal plate stiffening webs secured normal to the inner walls of the tank in spaced relationship about the inner walls of the tank;
- a second low temperature-resistant shell secured to said webs in liquid-tight relationship; and
- a layer of insulation secured to the inner surface of the ship hull about said tank.

6. A tank for containing liquefied hydrocarbon gases at about atmospheric pressure comprising a first stainless steel shell supported on a plurality of load-bearing insulation blocks, said shell anchored at about its center point on said blocks and free to slide on the other blocks to adjust to thermal changes;
- a plurality of stainless steel plate stiffening webs secured in spaced relationship longitudinally about the inner walls of the tank;
- a plurality of stainless steel plate stiffening webs secured in spaced relationship transversely about the inner walls of the tank and extending beyond the longitudinally-positioned webs;
- a second stainless steel shell fitted between the transverse webs and secured to the sides of the transverse webs and the top of the longitudinal webs in liquid-tight relationship; and
- a layer of insulation enclosing and spaced from said first shell.

7. In a vessel comprising a ship hull having incorporated therein means for marine propulsion, the combination therewith of
- a tank for containing a volatile liquid at atmospheric pressure comprising a first stainless steel shell supported on a plurality of load-bearing insulation blocks, said shell anchored at point on said blocks and free to slide on the others to adjust to thermal changes;
- a plurality of stainless steel stiffening webs secured in spaced relationship longitudinally about the inner walls of said first shell;
- a plurality of stainless steel stiffening webs secured in spaced relationship transversely about the inner walls of said first shell and extending beyond the longitudinally-positioned webs;
- a second stainless steel shell fitted between the transverse webs and secured to the sides of the transverse webs and to the tops of the longitudinal webs in liquid-tight relationship;
- a plurality of load-bearing insulation blocks attached about the external periphery of the tank each having its upper surface slanted upwardly and outwardly from said tank on a line passing through the anchor point of the tank;
- a plurality of load-bearing insulation blocks attached to the inner surface of the ship hull each having its lower surface slanted downwardly and outwardly in sliding contact with a block attached to the tank; and
- a layer of insulation between the tank and the ship hull.

References Cited

UNITED STATES PATENTS

| 2,513,749 | 7/1950 | Schilling | 220—9 |
| 2,858,136 | 10/1959 | Rind. | |
| 3,071,094 | 1/1963 | Leroux | 114—74 |
| 3,099,362 | 9/1963 | Schlumberger | 220—9 |
| 3,206,057 | 9/1965 | Prew | 220—15 |
| 3,251,501 | 5/1966 | Mesnanger | 220—15 |

MILTON BUCHLER, *Primary Examiner.*

T. M. BLIX, *Assistant Examiner.*